United States Patent
Takahashi et al.

(10) Patent No.: US 12,037,276 B2
(45) Date of Patent: Jul. 16, 2024

(54) APPARATUS FOR REMOVING BORON, METHOD FOR REMOVING BORON, APPARATUS FOR PRODUCING PURE WATER AND METHOD FOR PRODUCING PURE WATER

(71) Applicant: ORGANO CORPORATION, Tokyo (JP)

(72) Inventors: Kazushige Takahashi, Tokyo (JP); Fumio Sudo, Tokyo (JP); Yuki Nakamura, Tokyo (JP); Kenji Shibasaki, Tokyo (JP); Keisuke Sasaki, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 173 days.

(21) Appl. No.: 17/438,011

(22) PCT Filed: Feb. 13, 2020

(86) PCT No.: PCT/JP2020/005551
§ 371 (c)(1),
(2) Date: Sep. 10, 2021

(87) PCT Pub. No.: WO2020/184045
PCT Pub. Date: Sep. 17, 2020

(65) Prior Publication Data
US 2022/0162104 A1 May 26, 2022

(30) Foreign Application Priority Data
Mar. 13, 2019 (JP) .................................. 2019-045328

(51) Int. Cl.
*C02F 1/32* (2023.01)
*B01D 61/02* (2006.01)
(Continued)

(52) U.S. Cl.
CPC .............. *C02F 9/00* (2013.01); *B01D 61/025* (2013.01); *B01D 61/026* (2022.08); *B01D 61/44* (2013.01);
(Continued)

(58) Field of Classification Search
CPC ...... C02F 9/00; C02F 1/32; C02F 1/42; C02F 1/441; C02F 1/4695; C02F 1/66;
(Continued)

(56) References Cited

U.S. PATENT DOCUMENTS

| | | | | |
|---|---|---|---|---|
| 4,574,049 A | * | 3/1986 | Pittner ................. | B01D 61/026 210/639 |
| 5,766,479 A | * | 6/1998 | Collentro ................ | C02F 1/441 210/651 |

(Continued)

FOREIGN PATENT DOCUMENTS

| | | |
|---|---|---|
| CN | 1507417 A | 6/2004 |
| CN | 101827792 B | 8/2012 |

(Continued)

OTHER PUBLICATIONS

English Translation of Publication JP2005538827A, published Dec. 22, 2005. (Year: 2005).*

(Continued)

*Primary Examiner* — Joseph W Drodge
(74) *Attorney, Agent, or Firm* — Greenblum & Bernstein, P.L.C.

(57) ABSTRACT

A method for efficiently treating boron from water to be treated, an apparatus for producing pure water, and a method for producing pure water. An apparatus for removing boron includes a low-pressure reverse osmosis membrane apparatus to which is supplied water to be treated, a pH adjustment apparatus to adjust a pH of permeated water from the low-pressure reverse osmosis membrane apparatus to 5.0 to (Continued)

9.0, a high-pressure reverse osmosis membrane apparatus to which is supplied the water adjusted by the pH adjustment apparatus, and an electrodeionization to which is supplied permeated water from the high-pressure reverse osmosis membrane apparatus.

12 Claims, 2 Drawing Sheets (51) Int. Cl.
| | | |
|---|---|---|
| B01D 61/44 | (2006.01) | |
| B01D 61/58 | (2006.01) | |
| C02F 1/42 | (2023.01) | |
| C02F 1/44 | (2023.01) | |
| C02F 1/46 | (2023.01) | |
| C02F 1/66 | (2023.01) | |
| C02F 9/00 | (2023.01) | |
| C02F 1/469 | (2023.01) | |
| C02F 101/10 | (2006.01) | |
| C02F 101/30 | (2006.01) | |

(52) U.S. Cl.
CPC .......... *B01D 61/58* (2013.01); *B01D 2311/18* (2013.01); *B01D 2311/2619* (2013.01); *B01D 2311/2623* (2013.01); *C02F 1/32* (2013.01); *C02F 1/42* (2013.01); *C02F 1/441* (2013.01); *C02F 1/4695* (2013.01); *C02F 1/66* (2013.01); *C02F 2101/108* (2013.01); *C02F 2101/30* (2013.01); *C02F 2301/066* (2013.01); *C02F 2301/08* (2013.01)

(58) Field of Classification Search
CPC ............ C02F 2101/108; C02F 2101/30; C02F 2301/066; C02F 2301/08; C02F 1/20; C02F 1/008; C02F 1/44; C02F 1/58; C02F 2001/425; C02F 2103/04; C02F 2209/003; C02F 2209/008; C02F 2209/02; C02F 2209/03; C02F 2209/06; C02F 2209/08; B01D 61/025; B01D 61/026; B01D 61/44; B01D 61/58; B01D 2311/18; B01D 2311/2619; B01D 2311/2623; B01D 2311/06; B01D 2311/2603; B01D 61/02; B01D 61/08; B01D 61/10; B01D 61/12; B01D 2311/10; B01D 2311/14; B01D 2311/246; B01D 2311/25; B01D 2311/251

See application file for complete search history.

(56) References Cited

U.S. PATENT DOCUMENTS

| | | | |
|---|---|---|---|
| 2004/0099600 A1 | 5/2004 | Nishikawa et al. | |
| 2004/0188352 A1* | 9/2004 | Dey | B01D 61/026 210/639 |
| 2006/0231491 A1* | 10/2006 | Mukhopadhyay | B01D 61/58 423/580.1 |
| 2011/0036240 A1* | 2/2011 | Taylor | B01D 63/025 96/6 |
| 2016/0159671 A1 | 6/2016 | Ikuno | |
| 2017/0327396 A1* | 11/2017 | Ikuno | B01D 19/0031 |

FOREIGN PATENT DOCUMENTS

| | | | | |
|---|---|---|---|---|
| CN | 108602705 A | | 9/2018 | |
| JP | 2000-202442 | | 7/2000 | |
| JP | 2005538827 A | * | 12/2005 | ............... C02F 1/44 |
| JP | 2011-189298 A | | 9/2011 | |
| JP | 2015-20131 A | | 2/2015 | |
| JP | 2018-183761 A | | 11/2018 | |
| WO | WO-03031034 A1 | * | 4/2003 | ........... B01D 61/022 |

OTHER PUBLICATIONS

International Search Report issued in International Patent Application No. PCT/JP2020/005551, dated Apr. 7, 2020, along with English translation thereof.
Written Opinion of the International Searching Authority issued in International Patent Application No. PCT/JP2020/005551, dated Apr. 7, 2020, along with English translation thereof.
Office Action issued Jan. 5, 2023 in family member Japanese Patent Application No. 2019-045328 issued Jan. 5, 2023.
Office Action issued Feb. 1, 2023 in Chinese family member application No. 202080020655.9, with English language translation.
Office Action issued in Corresponding Taiwanese Patent Application No. 109106384, dated Jul. 4, 2023, along with an English translation thereof.

* cited by examiner

APPARATUS FOR REMOVING BORON, METHOD FOR REMOVING BORON, APPARATUS FOR PRODUCING PURE WATER AND METHOD FOR PRODUCING PURE WATER

TECHNICAL FIELD

The present invention relates to an apparatus for removing boron, a method for removing boron, an apparatus for producing pure water and a method for producing pure water.

BACKGROUND ART

Conventionally, pure water such as ultrapure water, in which organic substances, ionic components, fine particles, bacteria, etc. are highly removed, has been used as an application for cleaning water in the producing process of a semi-conductor device and a liquid crystal device.

In particular, when producing electronic components including semi-conductor devices, a large amount of pure water is used in the cleaning process, and the requirement for water quality is also increasing year by year.

For example, there is a demand for reduction of boron as a trace amount of impurities.

For this reason, a method combining a high-pressure reverse osmosis membrane (hyperbaric RO) and an ion exchange apparatus, such as that used in conventional seawater desalination, has been proposed with the aim of reducing a boron concentration (Patent Document 1).

PRIOR ART LITERATURE

Patent Documents

Patent Document 1: JP2005-20131A

SUMMARY OF INVENTION

Problems to be Solved by Invention

However, in the method of Patent Document 1, when suspended substances such as organic substances are present in a water to be treated, since it leads to a RO membrane contamination, it is necessary to lower an operating pressure by lowering a permeate water quantity of the RO membrane and to operate at low pressure. As the result, there was a problem of lowering the removal rate of boron by high pressure RO.

Further, when other ionic substances such as sodium are present in the water to be treated, there is also a problem that a boron removal rate of the electro-regenerative deionized water apparatus is lowered, and boron cannot be reduced to an extremely low concentration.

Accordingly, the present invention has made it a problem to reduce a concentration of boron in water.

Solution to Problem

The present inventors have found that by adjusting a pH of a water to be treated supplied to a high-pressure type reverse osmosis membrane apparatus to a predetermined range, the boron concentration can be greatly reduced.

That is, the present invention relates to
an apparatus for removing boron, comprising a low-pressure reverse osmosis membrane apparatus to which is supplied with a water to be treated,
a pH adjustment apparatus to adjust a pH of a permeated water from the low-pressure reverse osmosis membrane apparatus to 5.0 to 9.0,
a high-pressure reverse osmosis membrane apparatus to which is supplied with an adjustment water adjusted the PH by the pH adjustment apparatus, and
an electrodeionization to which is supplied with a permeated water from the high-pressure reverse osmosis membrane apparatus; and
a method for removing boron using the apparatus described above.

The present invention also relates to
an apparatus for producing pure water, comprising
a low-pressure reverse osmosis membrane apparatus to which is supplied with a water to be treated,
a pH adjustment apparatus to adjust a pH of a permeated water from the low-pressure reverse osmosis membrane apparatus to 5.0 to 9.0,
a high-pressure reverse osmosis membrane apparatus to which is supplied with an adjustment water adjusted the PH by the pH adjustment apparatus,
an electrodeionization to which is supplied with a permeated water from the high-pressure reverse osmosis membrane apparatus,
an ultraviolet oxidation apparatus to which is supplied with a water treated by the electrodeionization, and
a cartridge polisher to which is supplied with a water treated by the ultraviolet oxidation apparatus; and
a method for producing pure water using the apparatus described above.

Advantageous Effects of Invention

According to the present invention, there is provided an apparatus for boron removing boron and a method for removing boron capable of greatly reducing boron concentration.

Further, there is provided an apparatus for producing pure water and a method for producing pure water capable of producing pure water of high purity.

DESCRIPTION OF EMBODIMENTS

Hereinafter, the present invention will be described with reference to the drawings, but the present invention is not limited to the configuration described in the drawings.

Figure 1:
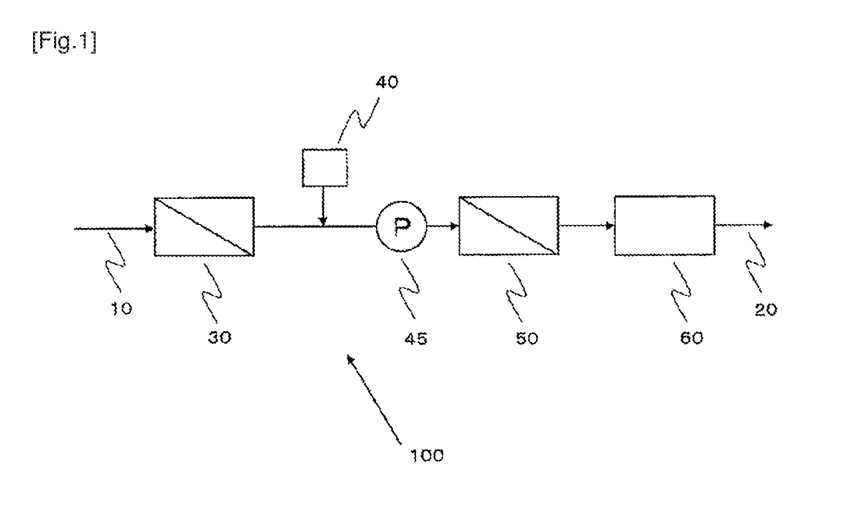
FIG. 1 is a conceptual diagram showing a configuration of a boron removing apparatus according to an embodiment of the present invention.

In FIG. 1, apparatus 100 for removing boron according to the present invention comprises,
low-pressure reverse osmosis membrane apparatus 30 to which is supplied with water to be treated 10,
pH adjustment apparatus 40 to which is supplied with a permeated water from low-pressure reverse osmosis membrane apparatus 30, high-pressure reverse osmosis membrane apparatus 50 to which is supplied via pump 45 with an adjustment water adjusted the PH by the pH adjustment apparatus, electrodeionization 60 to which is supplied with a permeated water from the high-pressure reverse osmosis membrane apparatus 50.

Then, in water to be treated 10, a suspended substance such as an ionic component and an organic substance in the water to be treated is removed by low-pressure reverse osmosis membrane apparatus 30, and then the permeated water thereof is adjusted to pH=5.0 to 9.0, preferably pH=5.5 to 8.5, and more preferably pH=7.0 to 8.5 by pH adjustment apparatus 40

When adjusted in a range of pH=9.0, although the boron inhibition rate in high-pressure reverse osmosis apparatus 50 is improved, this is undesirable because alkali leaks and reduces the performance of electrodeionization (EDI) 60.

In addition, when the pH is adjusted to 7.0 to 8.5, most of the carbonic acid component in water is ionized, so that the inhibition rate of the carbonic acid component is improved.

This can further improve the removal rate of boron by reducing the load of electrodeionization (EDI) 60.

Thereafter, the pH adjustment water is removed boron by high pressure reverse osmosis apparatus 50 and electrodeionization (EDI) 60, thereby obtaining treated water 20 having a reduced boron content.

As shown in FIG. 1, pH adjustment apparatus 40, can be used to inject the pH adjustment agent directly into the water in the line with a dosing pump, or a tank can be installed on the line to add and mix the pH adjustment agent.

The pH adjustment water is supplied by pump 45 to high pressure reverse osmosis apparatus 50 at a pressure of 1.0 to 4.0 MPa, preferably 1.5 to 2.0 MPa.

Figure 2:
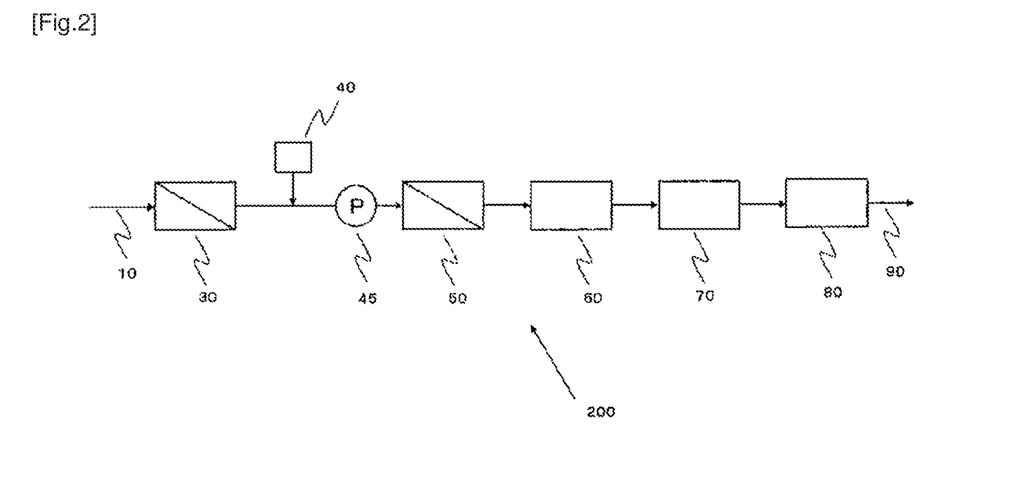
FIG. 2 is a conceptual diagram showing a configuration of an apparatus for producing pure water according to an embodiment of the present invention.

Next, an apparatus for producing pure water according to the present invention will be described.

In FIG. 2, apparatus 200 for producing pure water according to the present invention comprises, low-pressure reverse osmosis membrane apparatus 30 to which is supplied with a water to be treated, pH adjustment apparatus 40 to which is supplied with a permeated water from low-pressure reverse osmosis membrane apparatus 30, high-pressure reverse osmosis membrane apparatus 50 to which is supplied via pump 45 with an adjustment water adjusted the PH by the pH adjustment apparatus, electrodeionization (EDI) 60 to which is supplied with a permeated water from the high-pressure reverse osmosis membrane apparatus 50.

ultraviolet oxidation apparatus (UV) 70 which treats a water treated by the electrodeionization 60 with ultraviolet oxidation oxidation, and cartridge polisher 80 which treats a water treated by the ultraviolet oxidation apparatus 70.

Then, in water to be treated 10, a suspended substance such as an ionic component and an organic substance in the water to be treated is removed by low-pressure reverse osmosis membrane apparatus 30, and then the permeated water thereof is adjusted to pH=5.0 to 9.0, preferably pH=5.5 to 8.5 by pH adjustment apparatus 40

The pH-adjusted water is then treated in high-pressure reverse osmosis membrane apparatus 50 and electrodeionization (EDI) 60 to efficiently remove boron.

The total organic carbon (TOC) component remaining in the treated water is decomposed into organic acid and carbon dioxide by ultraviolet oxidation apparatus (UV) 70, and then treated by cartridge polisher (CP) 80 for ion exchange to finally produce pure water 90.

In semiconductor manufacturing, etc., pure water 90 is used as primary pure water and is supplied to subsystems to produce ultrapure water.

A membrane used in the low-pressure reverse osmosis membrane apparatus (BWRO apparatus) used in the present invention is a low-pressure membrane and an ultra-low-pressure membrane that can be operated at relatively low pressure.

As the low-pressure membrane and the ultra-low-pressure membrane, a permeation flux of pure water at effective-pressure 1 MPa and water temperature of 25° C. can be used from 0.65 to 1.8 m/d and preferably from 0.65 to 1.0 m/d.

Here, the permeation flux is an amount of permeated water divided by an area of a reverse permeation membrane.

An "effective pressure" is an effective pressure acting on the membrane by subtracting an osmotic pressure difference and a secondary pressure from an average operating pressure as described in JIS K3802:2015 "Membrane Terminology".

A mean operating pressure is a mean of a pressure of a membrane supply water (an operating pressure) and a pressure of a concentrated water (a concentrated water outlet pressure) on a primary side of the reverse osmotic membrane. The mean operating pressure is expressed by the following formula.

Average operating pressure=(operating pressure+ concentrated water outlet pressure)/2

The permeation flux per effective pressure 1 MPa can be calculated from information described in a membrane manufacturers catalogue, e.g., transmitted water volume, membrane area, recovery rate at assessment, NaCl level, etc.

When multiple reverse osmosis membranes, which are identical permeation fluxes, are loaded in one or more pressure vessels, a permeation flux of the loaded membranes can be calculated based on information such as a mean operating pressure/a secondary side pressure of the pressure vessels, a water quality of a water to be treated, a permeation water volume, a number of membranes, etc.

Examples of the low-pressure to ultra-low-pressure type reverse osmosis membrane include ES Series (ES15-D8, ES20-U8) (trade name) manufactured by Nitto Inc., ESPA Series (ESPAB, ESPA2, ESPA2-LD-MAX) (trade name), CPA Series (CPA5 MAX, CPA7-LD) (trade name) manufactured by HYDRANAUTICS, TMG Series (TMG20-400, TMG20D-440) (trade name), TM700 Series (TM720-440, TM720D-440) (trade name) manufactured by Toray Industries, Inc., BW Series (BW30HR, BW30XFR-400/34i), SG Series (SG30LE-440, SG30-400) (trade name), and FORTI-LIFE CR100 (trade name) manufactured by Dow Chemical Company.

The definition of "high-pressure" used for the high-pressure reverse osmosis membrane apparatus (SWRO apparatus) used in the present invention can be roughly defined as one that exhibits the following properties.

That is, one that exhibits the permeation flux of pure water at the effective pressure 1 MPa and water temperature of 25° C. of 0.2 to 0.65 m/d.

The effective pressure of the high-pressure reverse osmosis membrane is preferably 1.5 to 2.0 MPa.

It is possible to sufficiently raise the boron inhibition rate of the high-pressure reverse osmosis membrane by raising the effective pressure over 1.5 MPa.

Incidentally, although further boron inhibition rate improving effect can be expected by increasing the effective pressure above 2.0 MPa, because it is required to increase the durability pressure of the device, there is a case where the facility cost is increased.

The high-pressure reverse osmosis membrane includes, for example, SWC series (SWC4, SWC5, SWC6) (trade name) manufactured by HYDRANAUTICS, TM800 series (TM820V, TM820M) (trade name) manufactured by Toray Industries, Inc., and SW series (SW30HRLE, SW30ULE) (trade name) manufactured by Dow Chemical Company.

Next, the reverse osmosis membrane apparatus used in the present invention will be described.

The reverse osmosis membrane apparatus comprises a reverse osmosis membrane module composed of members such as reverse osmosis membranes and flow pathway materials and one or more pressure vessels loaded with one or more of them.

Pressure transfer of the water to be treated to the vessels loaded with the membrane modules provides a permeable water suitable for the effective pressure, from the vessels.

Also, water that does not permeate through the membrane module and is concentrated in the vessels is discharged from the vessels as a concentrated water.

There is no particular limitation in the shape of the reverse osmosis membrane module, and tubular, spiral, and hollow-fiber-type modules can be used.

When using multiple reverse osmosis membrane modules within the same vessels, each reverse osmosis membrane module is connected in series.

When multiple vessels are used in reverse osmosis membrane apparatus, the vessels can be placed in parallel or in tandem.

For example, the water to be treated which is transferred by pressure may be supplied to multiple vessels placed in parallel, and the permeated and concentrated water of each vessels may be joined and discharged from the apparatus.

In addition, the concentrated water discharged from each vessel can be made into a vessel configuration, such as the so-called Christmas tree method, which supplies another vessel.

The modular configuration, vessel configuration of these reverse osmosis membrane apparatus can be designed and selected according to the required permeate water quality, the permeation water volume, the water recovery rate, the footprint, etc.

The water recovery rate of each of the reverse osmosis membrane apparatus used in the present invention is calculated by the ratio of the water to be treated of each of the reverse osmosis membrane apparatus and the permeated water obtained by each of the reverse osmosis membrane apparatus.

That is, the recovery rate of each of the reverse osmosis membrane apparatus=(the amount of permeate water obtained by each of the reverse osmosis membrane apparatus)/(the amount of the water to be treated supplied to each of the reverse osmosis membrane apparatus).

The water recovery rate can be designed and selected according to the quality of the water to be treated, the required permeated water quality, the amount of permeable water, the water recovery rate, and the footprint, etc.

Although these are not particularly limiting, the recovery rate of the low-pressure reverse osmosis apparatus is 50 to 90%, preferably 65 to 85%, the recovery rate of high-pressure reverse osmosis membrane apparatus is 80 to 99%, and preferably 85 to 95%.

In particular, a high value can be set for the water recovery rate of the high-pressure reverse osmosis membrane because the impurity concentration is lowered by the low-pressure reverse osmosis membrane treatment.

In addition, chemicals (e.g., reducing agents, pH adjusters, scale dispersants, disinfectants, etc.) that are commonly used in reverse osmosis apparatus can be used in reverse osmosis membrane apparatus.

Next, the EDI used in the present invention will be described. EDI is an apparatus comprises a desalination chamber compartmentalized by an ion exchange membrane and filled with ion exchangers, a concentration chamber that concentrates the ions desalinated in the desalination chamber, and an anode and a cathode for passing electric current.

EDI is also an apparatus that simultaneously performs deionization (desalination) of the water to be treated by ion exchangers and regeneration of the ion exchangers by energizing and operating the current.

The treated water passed through the EDI is desalinated by the ion exchangers filled in the desalination chamber and discharged outside the EDI as EDI treated water. Similarly, the concentrated water with concentrated ions is discharged outside the EDI as EDI concentrated water.

The recovery rate of the EDI is calculated by the amount of the water to be treated provided to the EDI and the amount of the treated water obtained.

That is the recovery rate of the EDI=(the amount of the EDI treated water)/(the amount of the EDI water to be treated).

Although there is no particular limitation on the recovery rate of EDI, it is preferably 90 to 95%

The recovery rate of RO-EDI system is calculated by the ratio of the amount of the water to be treated to the amount of the treated water obtained by the EDI.

That is the recovery rate of RO-EDI system=the amount of EDI-treated water/the amount of the water to be treated.

Although there is no particular limitation on the water recovery rate of the present RO-EDI system, it is 80 to 99%, preferably 85 to 95%

Both high system recovery rate and water recovery rate can be satisfied in this system, because the system is not concentrate, while the concentrated water and EDI concentrated water of the high-pressure reverse osmosis membrane apparatus are recovered in this system.

In the treatment with EDI, two-step EDI treatment, in which EDI treated water is further treated with EDI, is preferred.

This makes it possible to produce pure water with a further reduced boron concentration.

Ultraviolet oxidation apparatus 70 is installed with the aim of removing organic matter that could not be removed by RO-EDI system.

Therefore, it is preferable to use an ultraviolet oxidation apparatus which irradiates ultraviolet rays containing a wavelength of 185 nm or less and performs ultraviolet oxidation treatment.

In some subsystems, ultraviolet oxidation apparatuses are also available.

For example, in facilities where a TOC concentration of 1 µg/L or less is required for ultrapure water, ultraviolet oxidation apparatuses can be placed in primary pure water systems with relatively high dissolved oxygen (DO) concentrations to reduce overall energy costs.

By the presence of dissolved oxygen, hydroxy radicals and hydrogen peroxide are generated from dissolved oxygen by ultraviolet irradiation, and it can be expected that the TOC decomposition efficiency is improved.

Although it is also possible to install the ultraviolet oxidation apparatus at the front stage of the EDI, it is preferable to install the ultraviolet oxidation apparatus at the later stage of the EDI because hydrogen peroxide, which is an oxidizing substance generated by polymerization of radicals generated in the ultraviolet oxidation apparatus, may deteriorate the ion exchange resin of the EDI and cause deterioration in performance.

Cartridge polisher 80 is a non-regenerative type ion exchange apparatus filled with an ion exchanger, and removes organic acids and carbon dioxide generated in the ultraviolet oxidation apparatus.

In the subsystem, cartridge polishers may also be installed, by placing the CP apparatus in this application, it is possible to prevent the influx of organic acids and carbon dioxide into the ultraviolet oxidation apparatus of the subsystem, so that the TOC concentration to be decomposed by the ultraviolet oxidation apparatus of the subsystem can be reduced, thus reducing the energy cost.

And, the exchange frequency can be reduced, because the ion load to the CP apparatus can also be reduced.

Also, a degassed membrane device (not shown) may be placed between high-pressure reverse osmosis membrane apparatus 50 and EDI 60.

Since the carbonic acid load on the EDI can be reduced by providing the degassing membrane device, it can be expected to remove coexisting ions and improve the boron removal rate.

In addition, because excessive DO concentration becomes a radical scavenger for the ultraviolet oxidation apparatus and TOC decomposition efficiency lowers, DO adjustment mechanism such as controlling vacuum and sweep gas flow on the gas side of the degassed membrane apparatus may be established.

The water to be treated used in the present invention may include, but is not particularly limited to, artificial water, groundwater, surface water, tap water, seawater, seawater desalinated by reverse osmosis or evaporation, sewage, treated sewage, various types of wastewater, such as wastewater used in semiconductor manufacturing processes, and mixed water of these.

As the water component to be treated, it is preferable to satisfy any one or more of conductivity of 10 to 1000 µS/cm, TDS of 5 to 500 ppm, boron concentration of 10 ppb to 10 ppm, and urea concentration of 1 to 100 ppb, and if these are not satisfied, it is preferable to perform pretreatment such as flocculation precipitation treatment, filtration treatment, softening treatment, decarboxylation treatment, activated carbon treatment, and the like.

As the water quality of the treated water of the high pressure-type reverse osmosis membrane apparatus obtained in the present invention, it is preferable to satisfy a conductivity of 2 µS/cm or less, a sodium concentration of 200 ppb or less, or both.

High sodium concentrations in the RO-permeable water (EDI feed water) also lead to the counterpart anions leaking from the RO along with sodium.

Therefore, the selectivity of boron in the ion exchange resin filled in the EDI decreases, and the boron of the EDI treated water cannot be sufficiently reduced.

Further, the water quality of pure water obtained in the present invention is not particularly limited to, and examples thereof include those having a specific resistance of 17 MΩ·cm or more, a boron concentration of 50 ppt or less, a silica concentration of 50 ppt or less, and a TOC concentration of 5 ppb or less.

EXAMPLES

Hereinafter, the present invention will be described in more detail using Examples, but the present invention is not limited to the Examples.

Examples 1 and 2, and Comparative Example 1

A water flow test was conducted for about 50 hours using the apparatus shown in FIG. 1 for 20 m³/h of treated water with 20 ppm of sodium, 10 ppm of calcium, 30 ppm of bicarbonate ion as $CaCO_3$, 10 ppm of ionic silica, 50 ppb of boron, and 0.5 ppm of TOC concentration.

For a low-pressure reverse osmosis (BWRO), CPA5-LD (trade name, manufactured by Hydranautics Co., Ltd.) was used, with a recovery rate of 80%.

For a high-pressure reverse osmosis membrane (SWRO), SW30HRLE-440 (trade name, manufactured by Dow Chemical Co., Ltd.) was used, with a recovery rate of 90%.

For a EDI, EDI-XP (trade name, manufactured by Organo Co., Ltd) was used, with a recovery rate of 90%. The operating current was set at 5 A.

The water quality of water to be treated, SWRO inlet water, SWRO permeate water, and EDI treated water was measured when the pH of the SWRO inlet water was changed to 5.5 (Example 1), 8.5 (Example 2), and 9.5 (Comparative Example 1), respectively, by a pH adjustment apparatus. Each result is shown in Tables 1 to 3, respectively.

TABLE 1

(Example 1)

| Item | Water to be treated | SWRO inlet water | SWRO permiate | EDI treated water |
|---|---|---|---|---|
| pH | 8 | 5.5 | 5.5 | — |
| Na concentration | 20 ppm | 1200 ppb | 87 ppb | <0.5 ppb |
| Boron concentration | 50 ppb | 30 ppb | 7.7 ppb | <0.05 ppb |
| Silica concentration | 10 ppm | 200 ppb | 5.0 ppb | <0.05 ppb |
| TOC concentration | 0.5 ppm | 83 ppb | 11 ppb | 5 ppb |
| Conductivity (µS/cm) or Specific resistance (MΩ · cm) | — | — | 1.6 µS/cm | >18 MΩ · cm |

TABLE 2

(Example 2)

| Item | Water to be treated | SWRO inlet water | SWRO permiate water | EDI treated water |
|---|---|---|---|---|
| pH | 8 | 8.5 | 8.0 | — |
| Na concentration | 20 ppm | 1500 ppb | 160 ppb | <0.5 ppb |
| Boron concentration | 50 ppb | 30 ppb | 6.8 ppb | <0.05 ppb |
| Silica concentration | 10 ppm | 200 ppb | 5.0 ppb | <0.05 ppb |
| TOC concentration | 0.5 ppm | 83 ppb | 11 ppb | 4 ppb |
| Conductivity (µS/cm) or Specific resistance (MΩ · cm) | — | — | 0.82 µs/cm | >18 MΩ · cm |

TABLE 3

(Comparative Example 1)

| Item | Water to be treated | SWRO inlet water | SWRO permiate water | EDI treated water |
|---|---|---|---|---|
| pH | 8 | 9.5 | 9.2 | |
| Na concentration | 20 ppm | 2000 ppb | 400 ppb | 0.7 ppb |
| Boron concentration | 50 ppb | 30 ppb | 5.5 ppb | 0.06 ppb |
| Silica concentration | 10 ppm | 200 ppb | 2.5 ppb | <0.05 ppb |
| TOC concentration | 0.5 ppm | 83 ppb | 11 ppb | 5 ppb |
| Conductivity (µS/cm) or Specific resistance (MΩ · cm) | — | — | 3.98 µS/cm | 17.7 MΩ · cm |

TABLE 3-continued (Comparative Example 1)

| Item | Water to be treated | SWRO inlet water | SWRO permiate water | EDI treated water |
|---|---|---|---|---|

Figure 3:
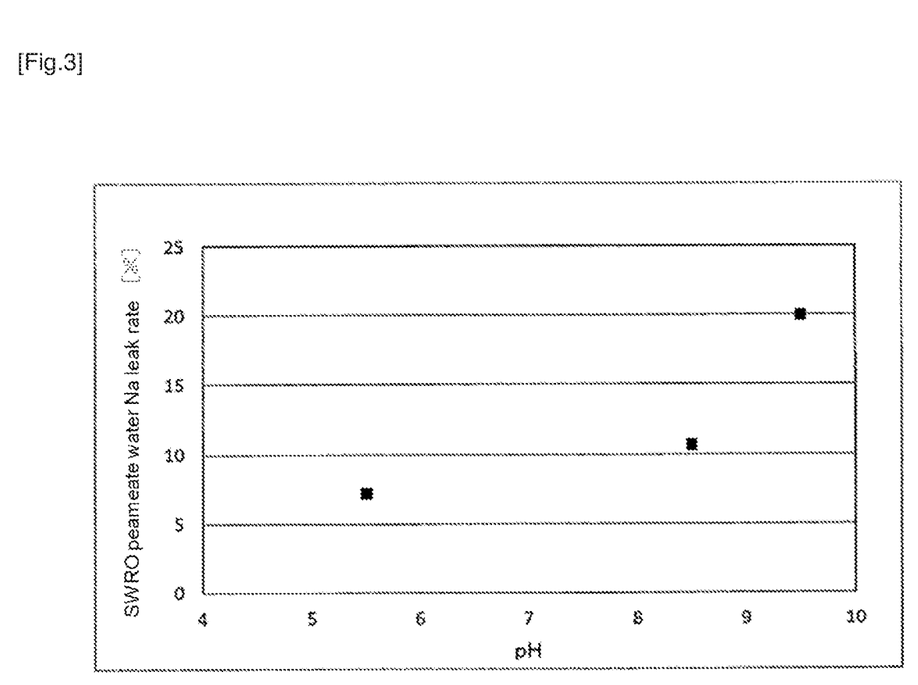
FIG. 3 is a conceptual diagram showing the sodium leak rate of SWRO permeated water.

In Tables 1 to 3, sodium-leak rate of SWRO permeated water at different pH of SWRO inlet water are shown in FIG. 3.

From Tables 1 to 3 and FIG. 3, it can be seen that by adjusting the pH of SWRO inlet water to 5.0 to 9.0, preferably 5.5 to 8.5, an EDI-treated water having a reduced boron concentration to 0.05 ppm (50 ppt) or less can be obtained.

Therefore, by adjusting the pH of SWRO inlet water to a predetermined value, the sodium concentration supplied to the EDI is lowered, and as a result, the removal rate of boron is improved.

Example 3

A water flow test was conducted under a flow rate of 2 m³/h in the order of the configuration of a EDI, an ultraviolet oxidation apparatus, and a CP apparatus (a resin tower) using a water to be treated with a conductivity 3 μS/cm, a boron concentration 14 ppb, a silica concentration 23 ppb, a TOC concentration 13 ppb, an inorganic carbon*(IC) concentration 300 ppb, DO concentration 8 ppm, and a $H_2O_2$ concentration 0 ppb.

For the EDI, EDI-XP (trade name, manufactured by Organo Co., Ltd) was used, with a recovery rate of 90%. The operating current was set at 5 A.

For the ultraviolet oxidation apparatus, JPW manufactured by Japanese Photo Science Co., Ltd was utilized.

For the resin tower, a cylindrical container made of acrylic (inner diameter: 25 mm, height: 600 mm) and filled with 200 ml of ion-exchange resin (ESP-2: manufactured by Organo Co., Ltd.) in this container was used.

In addition, a part of the treated water from the ultraviolet oxidation apparatus was branched off and passed through the resin tower at 12 L/h (SV=60).

Table 4 shows the water quality data after 2000 hours of water flow.

The EDI-desalting chamber differential pressure remained stable at the early 0.16 MPa.

TABLE 4

| Item | Water to be treated | EDI outlet | UV oxidizer outlet | Resin tower outlet |
|---|---|---|---|---|
| Boron concentration | 14 ppb | <0.05 ppb | <0.05 ppb | <0.05 ppb |
| Silica concentration | 23 ppb | <0.05 ppb | <0.05 ppb | <0.05 ppb |
| $H_2O_2$ concentration | 0 ppb | 0 ppb | 25 ppb | 25 ppb |
| TOC concentration | 13 ppb | 9 ppb | 4 ppb | 2 ppb |
| IC concentration | 300 ppb | <1 ppb | 3 ppb | <1 ppb |
| Conductivity (μS/cm) or Specific resistance (MΩ · cm) | 3 μS/cm | >17 MΩ · cm | — | >18 MΩ · cm |
| EDI desalting chamber differential pressure | — | 0.16 MPa | — | — |

Comparative Example 2

A water flow test was conducted under a flow rate of 2 m³/h in the order of an ultraviolet oxidation apparatus, and a EDI, using a water to be treated with a conductivity 3 μS/cm, a boron concentration 14 ppb, a silica concentration 23 ppb, a TOC concentration 13 ppb, an inorganic carbon*(IC) concentration 300 ppb, DO concentration 8 ppm, and a $H_2O_2$ concentration 0 ppb.

For the ultraviolet oxidation apparatus, JPW manufactured by Japanese Photo Science Co., Ltd was utilized.

For the EDI, EDI-XP (trade name, manufactured by Organo Co., Ltd) was used, with a recovery rate of 90%. The operating current was set at 5 A.

Table 5 shows the results after 5000 minutes of water flow.

The EDI desalting chamber differential pressure showed an upward trend due to 0.18 MPa from the early 0.16 MPa.

In addition, the $H_2O_2$ concentration was 25 ppb at the EDI inlet and 16 ppb at the EDI outlet, indicating that $H_2O_2H$ was consumed inside.

Since it is speculated that it is the differential pressure increase caused by deterioration of functional materials inside EDI, it may also affect the boron removal rate in the future.

There is a concern that the pressure resistance of the EDI apparatus may be exceeded, or that insufficient pressure of the supplied water may lead to a situation where the desired amount of water cannot be supplied.

In addition, it was judged that it was impossible to adapt to the actual system.

Therefore, the operation was shut down.

TABLE 5

| Item | Water to be treated | UV oxidizer outlet | EDI outlet |
|---|---|---|---|
| Boron concentration | 14 ppb | 14 ppb | — |
| Silica concentration | 23 ppb | 23 ppb | — |
| $H_2O_2$ concentration | 0 ppb | 25 ppb | 16 ppb |
| TOC concentration | 13 ppb | 4 ppb | 3 ppb |
| IC concentration | 300 ppb | — | — |
| Conductivity | 3 μS/cm | — | — |
| EDI desalting chamber differential pressure | — | — | 0.18 MPa |

REFERENCE SIGNS LIST 10 water to be treated
20 treated water
30 low-pressure reverse osmosis membrane apparatus (BWRO)
40 pH adjustment apparatus
45 pump
50 high-pressure reverse osmosis membrane apparatus (SWRO)
60 electrodeionization (EDI)
70 ultraviolet oxidation apparatus
80 cartridge polisher
90 pure water
100 apparatus for removing boron
200 apparatus for producing pure water

The invention claimed is:
1. An apparatus for removing boron, comprising:
a low-pressure reverse osmosis membrane apparatus which is supplied with a water to be treated,
a pH adjustment apparatus configured to adjust a pH of a permeated water from the low-pressure reverse osmosis membrane apparatus to 5.0 to 9.0, a high-pressure reverse osmosis membrane apparatus which is supplied with an adjustment water that has an adjusted pH from the pH adjustment apparatus, an electrodeionization apparatus which is supplied with a permeated water from the high-pressure reverse osmosis membrane apparatus, a pump provided downstream from the pH adjustment apparatus and configured to pump the adjustment water that has the adjusted pH to the high-pressure reverse osmosis membrane apparatus, and a degassing membrane device positioned downstream of the high-pressure reverse osmosis membrane apparatus and directly upstream of the electrodeionization apparatus, wherein the pH adjustment apparatus is positioned directly downstream from the low-pressure reverse osmosis membrane apparatus and directly upstream from the pump, and the pump is positioned directly upstream from the high-pressure reverse osmosis membrane apparatus.

2. The apparatus for removing boron according to claim 1, wherein, after starting with the adjustment water having a sodium concentration of 1200 ppb or more, the permeated water from the high-pressure reverse osmosis membrane apparatus has a conductivity of 2 µs/cm or less and a sodium concentration of 200 ppb or less.

3. The apparatus for removing boron according to claim 1, wherein, after starting with the permeated water from the high-pressure reverse osmosis membrane apparatus having a boron concentration of 6.8 ppb or greater, a treated water of the electrodeionization apparatus has a boron concentration of 50 ppt or less.

4. An apparatus for producing pure water, comprising:
a low-pressure reverse osmosis membrane apparatus which is supplied with a water to be treated,
a pH adjustment apparatus configured to adjust a pH of a permeated water from the low-pressure reverse osmosis membrane apparatus to 5.0 to 9.0,
a high-pressure reverse osmosis membrane apparatus which is supplied with an adjustment water that has an adjusted pH from the pH adjustment apparatus,
an electrodeionization apparatus which is supplied with a permeated water from the high-pressure reverse osmosis membrane apparatus,
an ultraviolet oxidation apparatus to which is supplied with a water treated by the electrodeionization apparatus,
a cartridge polisher to which is supplied with a water treated by the ultraviolet oxidation apparatus,
a pump provided downstream from the pH adjustment apparatus and configured to pump the adjustment water that has the adjusted pH to the high-pressure reverse osmosis membrane apparatus, and
a degassing membrane device positioned downstream of the high-pressure reverse osmosis membrane apparatus and directly upstream of the electrodeionization apparatus,
wherein the pH adjustment apparatus is positioned directly downstream from the low-pressure reverse osmosis membrane apparatus and directly upstream from the pump, and the pump is positioned directly upstream from the high-pressure reverse osmosis membrane apparatus.

5. The apparatus for producing pure water according to claim 4, wherein, after starting with the adjustment water having a sodium concentration of 1200 ppb or more, the permeated water from the high-pressure reverse osmosis membrane apparatus has a conductivity of 2 µs/cm or less and a sodium concentration of 200 ppb or less.

6. The apparatus for producing pure water according to claim 4, wherein, after starting with the permeated water from the high-pressure reverse osmosis membrane apparatus having a boron concentration of 6.8 ppb or greater, the pure water, after treatment by the cartridge polisher, has a boron concentration of 50 ppt or less.

7. A method for removing boron comprising:
(a) supplying a water to be treated to a low-pressure reverse osmosis membrane apparatus,
(b) supplying the permeate water from the low-pressure reverse osmosis membrane apparatus to a pH adjustment apparatus to adjust the pH to 5.0-9.0,
(c) supplying a permeated water that has an adjusted pH from the pH adjustment apparatus to a high-pressure reverse osmosis membrane apparatus via a pump, and treating it, and
(d) supplying the permeated water from the high-pressure reverse osmosis membrane apparatus to a degassing membrane device, and then directly to an electrodeionization apparatus and treating it,
wherein the pH adjustment apparatus is positioned directly downstream from the low-pressure reverse osmosis membrane apparatus and directly upstream from the pump, and the pump is positioned directly upstream from the high-pressure reverse osmosis membrane apparatus.

8. The method according to claim 7, wherein the permeated water from the high-pressure reverse osmosis membrane apparatus has a conductivity of 2 µs/cm or less, or a sodium concentration of 200 ppb or less, or both.

9. The method according to claim 7, wherein in the step (d), the treated water having been treated by the electrodeionization apparatus has a boron concentration of 50 ppt or less.

10. A method for producing pure water comprising:
(a) supplying a water to be treated to a low-pressure reverse osmosis membrane apparatus,
(b) supplying the permeate water from the low-pressure reverse osmosis membrane apparatus to a pH adjustment apparatus to adjust the pH to 5.0-9.0,
(c) supplying a permeated water that has an adjusted pH from the pH adjustment apparatus to a high-pressure reverse osmosis membrane apparatus via a pump, and treating it,
(d) supplying the permeated water from the high-pressure reverse osmosis membrane apparatus to a degassing membrane device, and then directly to an electrodeionization apparatus and treating it,
(e) supplying a water from the electrodeionization apparatus to an ultraviolet oxidation apparatus and removing organic substances, and
(f) supplying the water from which the organic substance has been removed to a cartridge polisher, treating the water from which the organic substance—has substances have been removed by ion exchange, and taking out pure water,
wherein the pH adjustment apparatus is positioned directly downstream from the low-pressure reverse osmosis membrane apparatus and directly upstream from the pump, and the pump is positioned directly upstream from the high-pressure reverse osmosis membrane apparatus.

11. The method according to claim 10, wherein the permeated water from the high-pressure reverse osmosis membrane apparatus has a conductivity of 2 μs/cm or less, or a sodium concentration of 200 ppb or less, or both.

12. The method according to claim 10, wherein the pure water, after treatment by the cartridge polisher, has a boron concentration of 50 ppt or less.

* * * * *